US009177308B2

(12) United States Patent
Grigg et al.

(10) Patent No.: US 9,177,308 B2
(45) Date of Patent: Nov. 3, 2015

(54) READABLE INDICIA FOR FUEL PURCHASE

(75) Inventors: David M. Grigg, Rock Hill, SC (US);
Glenn Grossman, Matthews, NC (US);
Matthew A. Calman, Charlotte, NC (US); Laura Corinne Bondesen,
Charlotte, NC (US); Alicia C. Jones,
Fort Mill, SC (US); **Peter John
Bertanzetti**, Charlotte, NC (US)

(73) Assignee: **BANK OF AMERICA
CORPORATION**, Charlotte, NC (US)

( * ) Notice: Subject to any disclaimer, the term of this patent is extended or adjusted under 35 U.S.C. 154(b) by 214 days.

(21) Appl. No.: 13/562,614

(22) Filed: Jul. 31, 2012

(65) Prior Publication Data
US 2014/0006186 A1  Jan. 2, 2014

Related U.S. Application Data

(60) Provisional application No. 61/665,060, filed on Jun. 27, 2012.

(51) Int. Cl.
*G06Q 20/00* (2012.01)
*G06Q 20/20* (2012.01)
*G06Q 30/02* (2012.01)
*G06Q 20/32* (2012.01)
*G07F 13/02* (2006.01)

(52) U.S. Cl.
CPC .............. *G06Q 20/20* (2013.01); *G06Q 20/204* (2013.01); *G06Q 20/3276* (2013.01); *G06Q 30/02* (2013.01); *G07F 13/025* (2013.01)

(58) Field of Classification Search
CPC ...................................... G06Q 20/204
USPC ...................................... 705/17, 66
See application file for complete search history.

(56) References Cited

U.S. PATENT DOCUMENTS

| 8,538,591 | B1 * | 9/2013 | Klughart | 705/30 |
| 2005/0246275 | A1 * | 11/2005 | Nelson | 705/40 |
| 2008/0308628 | A1 * | 12/2008 | Payne et al. | 235/381 |
| 2011/0137470 | A1 * | 6/2011 | Surnilla et al. | 700/282 |
| 2013/0006776 | A1 * | 1/2013 | Miller et al. | 705/44 |
| 2013/0097031 | A1 * | 4/2013 | Royyuru et al. | 705/16 |
| 2013/0109412 | A1 * | 5/2013 | Nguyen et al. | 455/456.3 |
| 2013/0246171 | A1 * | 9/2013 | Carapelli | 705/14.51 |

* cited by examiner

*Primary Examiner* — Hunter Wilder
(74) *Attorney, Agent, or Firm* — Michael A. Springs; Moore & Van Allen PLLC; Anup Shrinivasan

(57) ABSTRACT

Embodiments of the invention are directed to purchasing fuel for a vehicle from a fuel station. An exemplary apparatus is configured to: receive pre-configured information associated with an information-providing source associated with at least one of the fuel station or a fuel pump at the fuel station; determine identification information associated with the fuel pump that will be used for fueling the vehicle; and transmit a purchase authorization request to an external server based on the identification information and the pre-configured information.

14 Claims, 3 Drawing Sheets

READABLE INDICIA FOR FUEL PURCHASE

CROSS-REFERENCE TO RELATED APPLICATIONS

This application claims priority to U.S. Provisional Patent Application Ser. No. 61/665,060, filed Jun. 27, 2012, entitled "Mobile Device For Fuel Purchase," the entirety which is incorporated herein by reference.

BACKGROUND

There is a need to enable a customer to purchase fuel at a fuel station without swiping the customer's payment card at the fuel station.

BRIEF SUMMARY

Embodiments of the invention are directed to systems, methods and computer program products for purchasing fuel for a vehicle from a fuel station. An exemplary apparatus comprises: a memory; a processor; and a computing module stored in the memory, executable by the processor, and configured to: receive pre-configured information associated with an information-providing source associated with at least one of the fuel station or a fuel pump at the fuel station; determine identification information associated with the fuel pump that will be used for fueling the vehicle; and transmit a purchase authorization request to an external server based on the identification information and the pre-configured information.

In some embodiments, the apparatus further comprises a display, and the module is further configured to determine identification information based on the module being configured to: initiate, on the display, a user interface in response to receiving the pre-configured information; and enable selection, on the user interface, of a fuel pump associated with the fuel station.

In some embodiments, the module is further configured to: determine a location of the apparatus based on at least one of positioning system information or location information associated with a social networking account; and determine at least one of the identification information associated with the fuel pump or information associated with the fuel station based on the location of the apparatus.

In some embodiments, the module is further configured to: initiate, on the display, address information associated with the fuel station; and initiate, on the display, identification information associated with one or more fuel pumps associated with the fuel station.

In some embodiments, the module is further configured to enable selection, on the user interface, of a payment card to pay for the fuel purchase, wherein the apparatus accesses information associated with one or more payment cards.

In some embodiments, the vehicle is in communication with the apparatus, and the vehicle communicates to the apparatus information regarding an amount of fuel needed to fill the vehicle's fuel tank to a predetermined capacity.

In some embodiments, the purchase authorization request is further based on at least one of payment card information, social networking information or a selected type of fuel.

In some embodiments, the external server determines at least one of a pre-selected payment card, a pre-selected payment amount, or a discount eligibility for the purchase authorization request, processes the purchase authorization request based on one or more authorization rules, and transmits an electronic receipt to the apparatus.

In some embodiments, the external server sends an authorization prompt to the fuel station, wherein in response to receiving the authorization prompt, at least one of: an agent at the fuel station activates the fuel pump, or the fuel pump is automatically activated.

In some embodiments, the apparatus comprises an image-capturing component, wherein the information-providing source comprises readable indicia, and wherein the apparatus enables capture of an image of the readable indicia.

In some embodiments, the readable indicia is presented on a display associated with at least one of the fuel station or the fuel pump.

In some embodiments, the readable indicia comprises a sticker attached to the fuel pump.

In some embodiments, the readable indicia comprises a Quick Response (QR) code.

In some embodiments, the information-providing source comprises a near-field communication (NFC) tag.

In some embodiments, the pre-configured information comprises information pre-approved by at least one of a merchant associated with the fuel station or a user of the apparatus.

In some embodiments, the pre-configured information is pre-configured to be associated with the apparatus and not to be associated with another apparatus.

In some embodiments, a purchase transaction based on the purchase authorization request comprises a card-present transaction or a card-not-present transaction.

In some embodiments, the apparatus is integrated into the vehicle.

In some embodiments, a method is provided for purchasing fuel for a vehicle from a fuel station. The method comprises: receiving pre-configured information associated with an information-providing source associated with at least one of the fuel station or a fuel pump at the fuel station; determining identification information associated with the fuel pump that will be used for fueling the vehicle; and transmitting a purchase authorization request to an external server based on the identification information and the pre-configured information.

In some embodiments, a computer program product is provided for purchasing fuel for a vehicle from a fuel station. The computer program product comprises a non-transitory computer-readable medium comprising a set of codes for causing a device to: receive pre-configured information associated with an information-providing source associated with at least one of the fuel station or a fuel pump at the fuel station; determine identification information associated with the fuel pump that will be used for fueling the vehicle; and transmit a purchase authorization request to an external server based on the identification information and the pre-configured information.

BRIEF DESCRIPTION OF THE DRAWINGS

Figure 1:
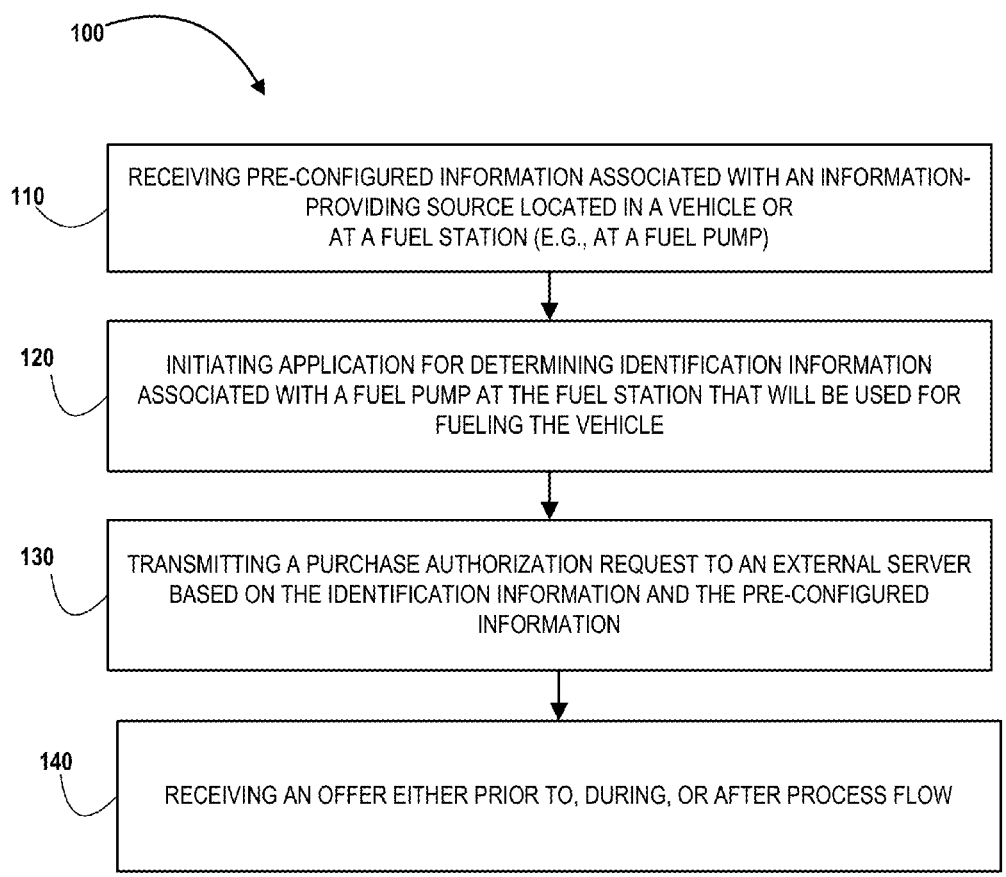
Figure 2:
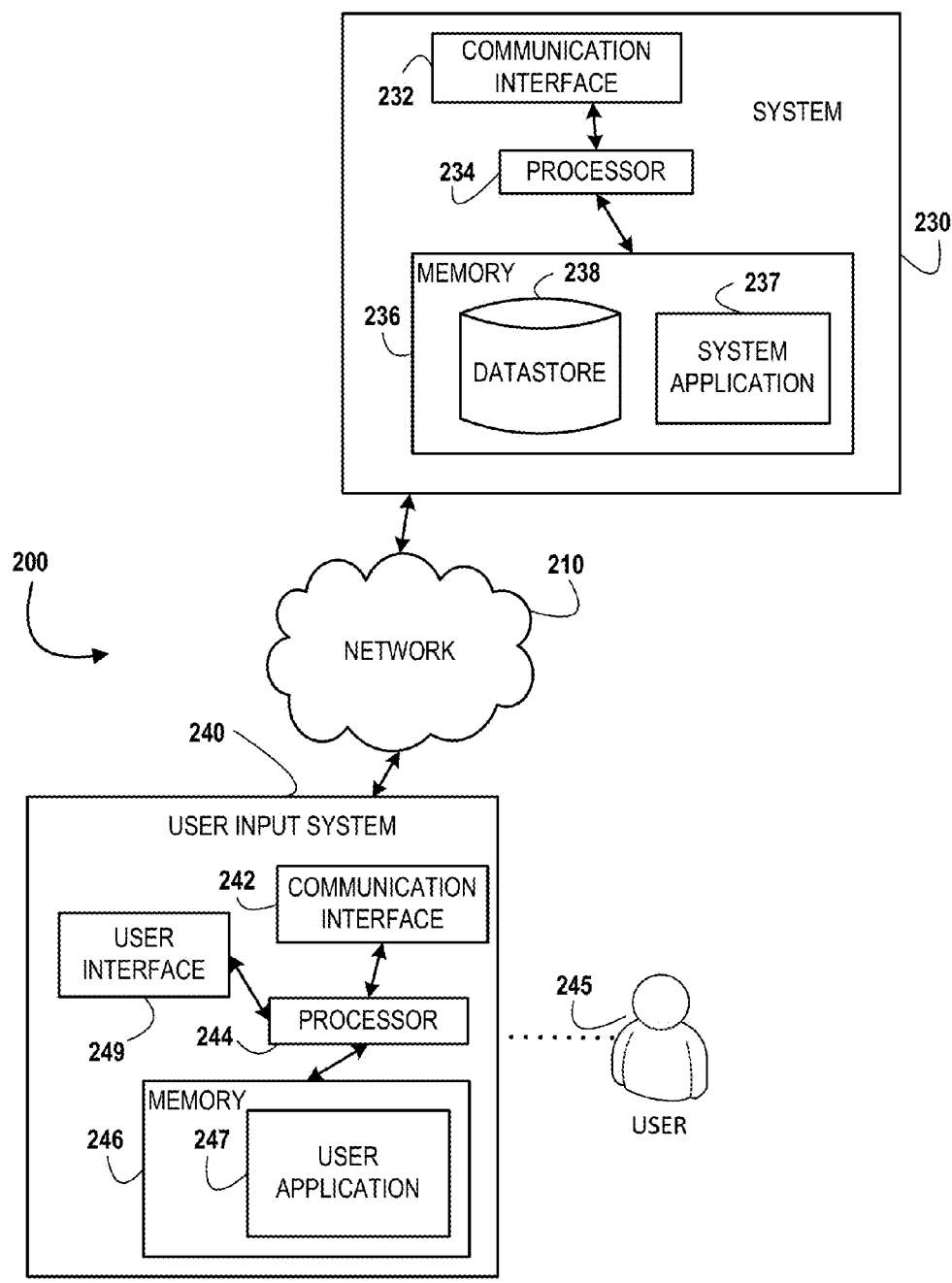
Figure 3:
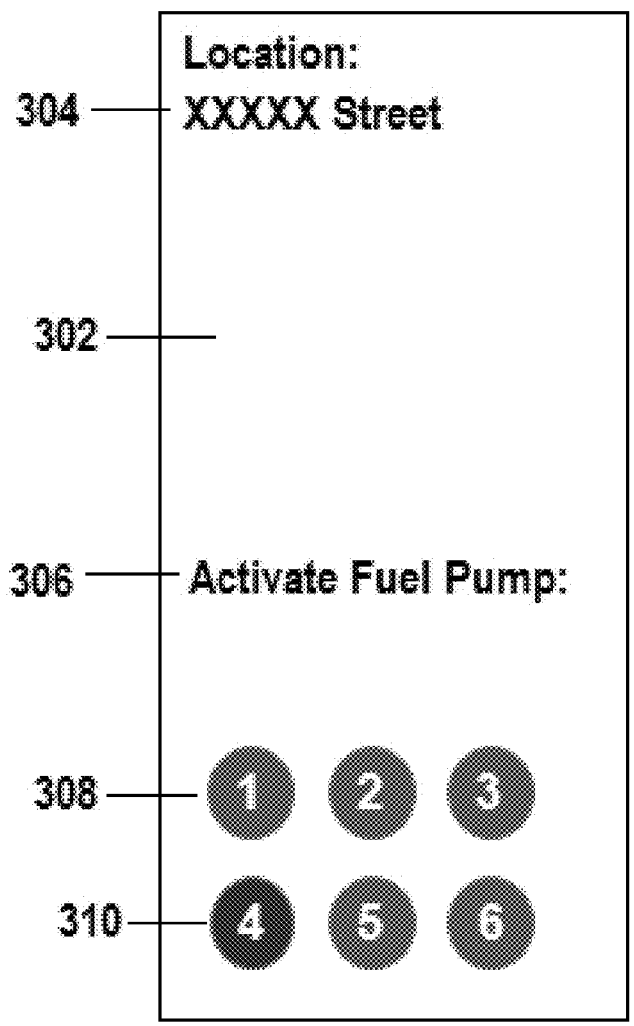

Having thus described embodiments of the invention in general terms, reference will now be made to the accompanying drawings, where:

FIG. 1 is a flowchart illustrating a general process flow for purchasing fuel for a vehicle from a fuel station, in accordance with embodiments of the present invention; and FIG. 2 is a block diagram illustrating technical components of a system for purchasing fuel for a vehicle from a fuel station, in accordance with embodiments of the present invention; and FIG. 3 is an exemplary user interface associated with a mobile device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A person may need to purchase fuel for his or her vehicle. In order to find a fuel station nearby, the person may use an application on a mobile device (or on an in-vehicle display) to find a conveniently located fuel station (e.g., the nearest fuel station, the fuel station offering the cheapest fuel prices, or the like). Upon receiving the user's selection of a fuel station, the application may provide directions to the fuel station. Upon entering the fuel station, the person parks his or her vehicle near a fuel pump with the intention of purchasing fuel for the vehicle. Embodiments of the invention are directed to systems, methods and computer program products for purchasing fuel for a vehicle from a fuel station. The process flow associated with the transaction for purchasing fuel described herein is analogous to a "card-present transaction," which comprises a payment card being presented (e.g., swiped) at a payment terminal. In alternate embodiments, the process flow associated with the transaction may be analogous to a "card-not-present transaction," which comprises a payment being made without a payment card being presented for payment (e.g., an online electronic payment).

Referring now to FIG. 1, a general process flow 100 is provided for purchasing fuel for a vehicle from a fuel station. At block 110, the method comprises receiving, at a portable mobile communication apparatus, pre-configured information associated with an information-providing source in a vehicle. The portable mobile communication apparatus may also be referred to as a mobile device.

The pre-configured information comprises information pre-approved by a merchant associated with the fuel station and a user of the mobile device to enable the user to purchase fuel for a vehicle. Therefore, the user and the merchant agree that the pre-configured information may be used to generate an authorization request to purchase fuel for a vehicle that comprises the information-providing source. As used herein, the pre-configured information may refer to any identification information that identifies at least one of the fuel station, the fuel pump, the merchant associated with the fuel station, the user's vehicle, the user's mobile device, the user (or other information associated with the user), or the like.

The information-providing source may comprise readable indicia. The readable indicia may comprise visual indicia. For example, the readable indicia may comprise any kind of one-dimensional or two-dimensional code (e.g., barcode, Quick Response (QR) code). A user may use a mobile device that comprises an image-capturing component to capture an image of the code. Alternatively or additionally, the readable indicia need not comprise visual indicia. The readable indicia may comprise any indicia, visual or non-visual, where information associated with the indicia is receivable or readable (e.g., scannable) by a mobile device. For example, the readable indicia is comprised in a tag (e.g., radio frequency identification (RFID) tag, near field communication (NFC) tag, or the like). A user may bring a mobile device in close proximity to the tag in order to receive information (e.g., readable indicia or pre-configured information) associated with the tag.

The information-providing source may comprise a display. Therefore, the readable indicia may be presented on a display in the vehicle. The display may be a display on the dashboard, the center console, or any other part of the vehicle. The display may be a touchscreen display. The vehicle may receive the readable indicia from an external server. The vehicle may comprise a computing system that includes a memory, a processor, and a computing module that works in conjunction with the memory and the processor to initiate presentation of the readable indicia on the display. In some embodiments, the computing system in the vehicle may also include a positioning system (e.g., a global positioning system). The computing system may determine when the vehicle enters the fuel station and may automatically download from the external server (which may or may not be located at the fuel station) via one or more short-range or long-range wireless mechanisms and initiate presentation of readable indicia associated with the fuel station (e.g., readable indicia for purchasing fuel) on the display. Alternatively, the computing system in the vehicle may download and initiate presentation of readable indicia upon receiving a selection (e.g., via an input device such as the in-vehicle display) by a user. The readable indicia is dynamic such that the readable indicia for fuel purchase received during one transmission from the external server (or generated in a first instance as explained below) may be different from the readable indicia received during another transmission from the external server (or generated in a second instance). When the readable indicia is presented on the display, the readable indicia may be single-use readable indicia such that the readable indicia presented for a first fuel purchase is different from the readable indicia presented for a second fuel purchase. Therefore, when the readable indicia is presented on the display, the readable indicia may not be used to make more than one fuel purchase.

Alternatively, the readable indicia may be automatically generated by the computing system located in the vehicle. Therefore, the readable indicia may be automatically and dynamically generated upon the computing system in the vehicle determining that the vehicle has entered the fuel station. Alternatively, the readable indicia for fuel purchase may be generated upon the user selecting one or more options presented on the display in the vehicle.

Alternatively, the readable indicia may comprise a sticker removably attached to an internal part of the vehicle. Examples of internal parts of the vehicle include the center console, steering wheel, door panel, seat, dashboard, sun visor, or the like. The sticker may be attached to an internal part of the vehicle (e.g., inside the glove compartment or the sun visor) such that the sticker is accessible and/or visible to those inside the vehicle, and not accessible and/or visible to those outside the vehicle.

Alternatively, the information-providing source comprises an active or passive near-field communication (NFC) or radio frequency identification (RFID) tag. A user may bring a mobile device in close proximity to the tag in order to receive pre-configured information associated with the tag.

Alternatively, the information-providing source may be provided outside the vehicle at the fuel pump or elsewhere in the fuel station. The mobile device may receive information from the information-providing source similar to previously described embodiments. In such embodiments, the user may receive the pre-configured information to the user's mobile device without alighting from the vehicle.

Alternatively, instead of the mobile device communicating with and receiving pre-configured information from the information-providing source, the vehicle (or a computing system associated with the vehicle) may be enabled to receive the pre-configured information from the information-providing source via one or more short-range wireless mechanisms. Exemplary short-range wireless mechanisms include near-field communication (NFC), infra-red transmission (IR), Bluetooth, short-range radio frequency (RF) signals, IEEE 802.11x, WiFi, wireless universal serial bus (USB), IrDA-based (Infrared Data Association) transmission, image capture, or the like. As described herein, the information-providing source may be located either inside the vehicle or outside the vehicle (e.g., at the fuel pump or anywhere else in the fuel station).

In some embodiments, the method subsequently proceeds to block 120. In alternate embodiments, the method starts at block 120. Therefore, in these alternate embodiments, the mobile device does not receive readable indicia from an information-providing source. In such embodiments, the mobile device may identify a fuel station where the mobile device is located based on global positioning system (GPS) coordinate information, and may initiate an application to enable selection of a fuel pump, and creation and transmission of a payment authorization request. In other embodiments, upon entering the fuel station, the user may initiate at least one application to enable selection of a fuel pump, and creation and transmission of a transmission of a payment authorization request. In some embodiments, the application prompts a user to enter a passcode upon initiation. Upon successful verification of the passcode, the application enables the user to make a fuel purchase. The passcode may be verified by at least one of the mobile device or the external server in communication with the mobile device.

At block 120, the method comprises determining identification information associated with a fuel pump at the fuel station that will be used for fueling the vehicle. The mobile device may initiate, on the display of the mobile device, a payment application user interface in response to receiving the pre-configured information. Therefore, the user does not need to exit his or her vehicle in order make the fuel purchase. Additionally, the mobile device may enable selection, on the user interface, of a fuel pump associated with the fuel station. Therefore, a user of the mobile device may select a fuel pump that will be used for fueling the vehicle. In some embodiments, the mobile device may be in wireless or wired communication with the computing system in the vehicle. Therefore, the mobile device user interface may be displayed on the display in the vehicle.

Additionally, the mobile device may comprise a global positioning system or some other location determining system. The mobile device may use the location determining system to determine a location of the mobile device, and determine identification information (e.g., address information) for a fuel station proximate to where the mobile device is located. Additionally, the mobile device may use the location determining system to determine identification information (e.g., pump number) associated with a fuel pump (e.g., the fuel pump located closest to the mobile device) that will be used to fuel the vehicle. In embodiments where the mobile device determines identification information associated with a fuel pump, the user does not need to select a fuel pump.

Once the mobile device determines identification information associated with the fuel station where the mobile device is located, the mobile device initiates, on the display of the mobile device, a user interface. Referring now to FIG. 3, FIG. 3 displays this user interface 302. The mobile device initiates, on the display, address information 304 associated with the fuel station, and identification information (e.g., pump number) associated with one or more fuel pumps 308 associated with the fuel station. As described previously, a user of the mobile device may select a fuel pump 310 that will be activated 306 for fueling the vehicle. Additionally, either prior to or after determination of the fuel pump identification number, the mobile device may prompt the user to select the type of fuel desired by the user (e.g., regular, supreme, diesel or the like).

Additionally, the mobile device comprises a mobile wallet that includes information associated with one or more payment cards (credit cards, debit cards, or the like). As used herein, a payment card may also represent a payment account (e.g., a financial institution account). The mobile device enables selection, on the user interface, of a payment card to pay for the fuel purchase. Additionally, the mobile device enables selection, on the user interface, of a payment amount for the fuel purchase. The user interface for selecting a payment card and the payment amount may be presented in response to the user selecting a pump number for fueling the vehicle. If the user does not select a payment card and/or a payment amount, the mobile device automatically selects a default payment card and a default payment amount previously selected by the user. Alternatively, as explained below, if the user does not select a payment card and/or a payment amount, the external server automatically selects a default payment card and a payment amount associated with the pre-configured information transmitted to the external sever, wherein the default payment card and payment amount (e.g., a maximum payment amount) were previously selected by the user to be associated with the pre-configured information. In embodiments where the mobile device is in communication with the computing system of the vehicle, the mobile wallet information may be displayed on the display in the vehicle.

Additionally or alternatively, when the user drives in to or enters the fuel station, the user may "check in" at the fuel station using a social networking application (e.g., the user's social networking account). Checking in at the fuel station enables the mobile device and an external server to determine the location of the mobile device. When the user checks in at the fuel station, the mobile device may automatically initiate the payment application user interface. Additionally, when the user checks in at the fuel station using the user's social networking account, the user may receive a discount on a fuel purchase for "checking in" via the user's social networking account.

At block 130, the method comprises transmitting, by the mobile device, a purchase authorization request to an external server based on the pre-configured information received by the mobile device. Additionally, the purchase authorization request may be based on the identification information associated with at least one of the fuel station where the mobile device is located or the fuel pump that will be used to fuel the vehicle. Additionally, the purchase authorization request may be based on a type of fuel selected by the user. Additionally, the purchase authorization request may be based on information associated with a payment card and/or a payment amount selected by a user of the mobile device. When the authorization request is not based on information associated with a payment card and/or a payment amount, the external server determines a payment card and/or a payment amount associated with the pre-configured information. This payment card and/or payment amount may have been previously selected by the user to pay for a fuel purchase from the fuel station. Alternatively, when the authorization request is not based on information associated with a payment card, the external server may determine a prepaid payment account associated with the pre-configured information, wherein the prepaid account may be established by the user for fuel purchase from the fuel station. If the external server determines that the balance in the prepaid payment account is below a certain threshold (e.g., zero), the external server transmits a rejection message to the mobile device.

In some embodiments, the external server receives the purchase authorization request and determines a payment method selected by the user (e.g., credit card, debit card, prepaid account, or the like). The external server then determines whether the user is eligible for a discount or rebate on the fuel purchase if the user uses an alternate payment method (e.g., debit card, prepaid account, or the like) rather than the selected payment method (e.g., credit card). In such embodiments, the external server communicates a message to the user's mobile device informing the user that the user is entitled to a discount or rebate on the fuel purchase if the user selects the alternate payment method. Therefore, the user may select an alternate payment method (and enter details associated with the alternate payment method if the user has not previously provided details associated with the alternate payment method), and the mobile device transmits the user's selection to the external server. Alternatively, the user may select an option to pay with the originally selected payment method.

As explained herein, the user's vehicle may be in communication with the user's mobile device. In some embodiments, the vehicle determines how much fuel it needs to fill up the vehicle's fuel tank to a predetermined capacity (e.g., 100% capacity). Therefore, the vehicle may communicate this information to the mobile device. In some embodiments, the vehicle may additionally or alternatively communicate this information to the external server, which may use the information for transmitting an offer to the user. Prior to transmitting the payment authorization request to the external server, the mobile device may initiate presentation of several options to the user. The mobile device may present a first option to fill up the fuel tank to 100% capacity and the accompanying cost of the fuel purchase based on a previously selected type of fuel purchase (e.g., regular, supreme, diesel or the like). The mobile device (or the external server) determines the cost of the fuel purchase based on determining the fuel station associated with the mobile device's location, and the prices of various fuel types associated with the fuel station. Based on the information received form the vehicle, the mobile device may determine how much fuel is needed to fill up the tank to 70% capacity, 50% capacity, or any other percentage capacity. Additionally, the mobile device may present a second option to fill up the fuel tank to 70% capacity (or some other predetermined percentage) and the accompanying cost of the fuel purchase based on a user-selected type of fuel purchase (e.g., regular, supreme, diesel, or the like).

The external server may be located at the fuel station and may be associated with the fuel pump described herein. When the external server is located at the fuel station, the mobile device may send the purchase authorization request via one or more short range wireless mechanisms (or via the mobile telecommunication network) described herein to the external server. Alternatively, the external server may be located remotely from the fuel station. When the external server is located remotely from the fuel station, the mobile device may send the purchase authorization request via the mobile telecommunication network or some other long range data network. In some embodiments, each fuel pump may be associated with a separate computing system that can activate and deactivate the fuel pump. Therefore, each fuel pump's computing system may have a different network address. As used herein, a network address may be an Internet Protocol (IP) address.

Additionally, the user may use a social networking gift (e.g., social networking points or credits) to pay for the fuel purchase. Therefore, the authorization request may be additionally based on information associated with the user's social networking account and information associated with social networking gifts or credits received by (or purchased by) the user's social networking account.

The external server processes the authorization request based on one or more authorization rules. Upon verifying the payment information for the fuel purchase, the external server sends an authorization prompt to a computing system (e.g., associated with a unique network address) at the fuel station, wherein in response to receiving the authorization prompt, an agent at the fuel station activates the fuel pump in closest proximity to the vehicle. The authorization prompt may be accompanied by a sound beep, an activated light, or the like. Alternatively, in an automatic embodiment, the external server sends an authorization message to a computing system (associated with a unique network address) associated with the fuel pump, wherein the fuel pump is automatically activated by the computing system upon receiving the authorization message. After the car has been fueled using fuel at the fuel pump, the external server may transmit an electronic receipt to the mobile device. Alternatively or additionally, a receipt associated with the purchase may be printed at the fuel station (e.g., at the fuel pump) if the user previously selected an option using the application described herein to receive a paper receipt.

The external server may process the authorization request based on a relationship that the user has with the merchant associated with the fuel station and/or the financial institution associated with the payment card or account being used for the fuel purchase. The relationship information for the user may be accessed by the external server based on the pre-configured information or other identification information. The relationship information may be used to determine a price to charge the user for a fuel unit. For example, the user may be given a discount or rebate if the user satisfies one or more conditions associated with the discount or rebate (e.g., length of relationship with merchant and/or financial institution, number of previous fuel purchases from merchant, amount associated with previous fuel purchases). Therefore, a first user at the fuel pump may pay a different price per unit of fuel compared to a second user. Additionally, if the user's authorization request is associated with a prepaid payment account, the user may receive a predetermined discount on the fuel purchase.

The user may pre-register the user's mobile device to be associated with the pre-configured information. Therefore, if any non-registered mobile devices receive the pre-configured information and transmit a purchase authorization request to the external server, the external server rejects the request. This rejection may be communicated to at least one of the mobile device or the computing system associated with the fuel station or the fuel pump. In other embodiments, the pre-configured information that is received by an unregistered mobile device may prevent the unregistered mobile device from transmitting an authorization request to the external server based on the pre-configured information.

In some embodiments, the mobile device may also include a vehicle or the vehicle may also include the mobile device. Therefore, in some embodiments, the mobile device functionality may be integrated into a vehicle. Thus, the display of the mobile device may refer to the display of the vehicle. Thus, any function that is described as being performed by the mobile device may be performed by a computing system associated with or located in the vehicle. Any information that is described as being presented on a display of a mobile device may be displayed on the display in a vehicle. Therefore, the vehicle may receive pre-configured information from an information-providing source located in the vehicle, at the fuel pump, or anywhere else in the fuel station. The vehicle may communicate, either directly or over a network, with the fuel pump, fuel station, external server, the user's mobile device, or the like. The computing system associated with the vehicle may have its own network address (e.g., Internet Protocol (IP) address).

In some embodiments, when the user "checks in" at the fuel station using the user's social networking account, or when the mobile device determines that the user's mobile device is located at the fuel station, or when the mobile device receives the pre-configured information from the information-providing source, or when the mobile device transmits the purchase authorization request to the external server, the mobile device or an external server in communication with the mobile device may determine that user is going to purchase fuel for the user's vehicle.

At block 140, the method comprises transmitting an offer to the user (e.g., the user's mobile device, the user's vehicle, or the like). The offer may be transmitted at any time (or at multiple times) either prior to, during, or after process flow 100. For example, the offer may be transmitted a predetermined period before the user enters the fuel station (e.g., when the user initiates an application to find a fuel station), while entering the fuel station, upon parking the user's vehicle at the fuel station (e.g., near a fuel pump), upon receiving the pre-configured information, upon transmitting a purchase authorization request, upon activation of the fuel pump, while fueling the vehicle, upon completion of fueling, while exiting the fuel station, a predetermined period after exiting the fuel station, or upon a level or amount of fuel in the vehicle's fuel tank being equal to or less than a predetermined level or amount. The offer transmission time is not limited to the examples described herein.

Therefore, in some embodiments, the external server may transmit one or more offers to the user's mobile device. These offers are presented on the user interface of the mobile device. Additionally, an option may be presented to activate an offer. If the user chooses to activate an offer, the offer is applied to a subsequent purchase made by the user that qualifies for the offer. The offer may be related to the fuel purchase (e.g., a predetermined discount or rebate if the user purchases a predetermined minimum number of fuel units or if the user purchases fuel for a predetermined minimum dollar amount). Alternatively, the offer may be related to products sold at a convenience store at the fuel station. Alternatively, the offer may be related to the user's vehicle (e.g., vehicle maintenance services, car wash at the fuel station, or the like). Alternatively, the offer may be related to products sold at stores associated with the merchant associated with the fuel station. Still alternatively, the offer may be related to any product or service based on at least one of account information or user information associated with the user of the mobile device.

The offer (e.g., for a fuel purchase) may be presented to the user on the mobile device upon determining the mobile device is located at the fuel station (e.g., when the user's vehicle enters the fuel station or when the user parks his or her car at the fuel station). Therefore, the offer may be activated by the user and if the offer is valid for a fuel purchase, the offer may be used for the fuel purchase for the user's vehicle.

Additionally or alternatively, the offer (e.g., for a car wash) may be presented to the user on the mobile device upon transmitting the purchase authorization request to the external server or upon completion of fueling of the user's vehicle. Therefore, the offer may be activated by the user and used for a subsequent purchase associated with a product or service specified by the offer.

As an example, the offer may be a rebate of $5 on a purchase of $20 of fuel and is transmitted to the user's mobile device upon determining the user's mobile device is located at the fuel station. The user may activate the offer. By activating the offer, the offer will be applied to the next purchase of fuel for $20. The offer is transmitted along with the purchase authorization request described herein. When the transaction (and/or the offer) is processed by the financial institution at a predetermined settlement time in the future (e.g., as part of a periodic batch processing operation to generate monthly account statements), the financial institution provides a rebate of $5 to the user's financial institution account after checking whether fuel was purchased for at least $20. If the user makes multiple purchases of fuel for $20 during a predetermined period (e.g., a day), the offer is applied to the largest purchase of fuel during the predetermined period or is applied to an aggregate of the fuel purchases (wherein each fuel purchase is worth $20) during the predetermined period. Therefore, if the offer is an offer for a percentage discount, the rebate amount applied to the user's account increases if the purchase amount increases.

As a further example, the activated offer may be a rebate of $5 on a $20 car wash and is transmitted to the user upon transmitting the purchase authorization request to the external server or upon completion of fueling of the user's vehicle. The user may activate the offer. By activating the offer, the offer will be applied to the next purchase of a car wash of $20. When the transaction is processed by the financial institution at a predetermined settlement time in the future (e.g., as part of a periodic batch processing operation to generate monthly account statements), the financial institution provides a rebate of $5 to the user's financial institution account after checking whether a car wash was purchased for at least $20. If the user makes multiple purchases of car washes for $20 during a predetermined period (e.g., a day), the offer is applied to the largest purchase of a car wash during the predetermined period or is applied to an aggregate of the car wash purchases (wherein each car wash purchase is worth $20) during the predetermined period. Therefore, if the offer is an offer for a percentage discount, the rebate amount applied to the user's account increases if the purchase amount increases.

In other embodiments, the offer is transmitted, via pop-up message (e.g., text message), to the user's mobile device. In some embodiments, the offer is transmitted to the user's email account. In some embodiments, the offer is presented via at least one of a user interface associated with the user's financial institution account (e.g., online banking account, mobile banking account on a portable mobile communication device, or the like), a user interface associated with the user's social network account, or a user interface associated with the user's in-vehicle display. In some embodiments, the offer is inserted into or presented alongside (e.g., on the right, left, top, bottom side of a transaction, or between multiple transactions) the transaction history that is presented on the user's online banking account or mobile banking account. Therefore, for example, if ten transactions are listed in the transaction history, the offer may be presented between the fourth and fifth transactions. In some embodiments, the offer may be related to the transaction which the offer is presented alongside (e.g., the fourth and/or fifth transaction in the above example). For example, if the fourth transaction is a purchase of item 'A' from merchant 'A,' the offer is for a purchase of item 'A' (e.g., from any merchant) or for a purchase from merchant 'A' (e.g., for any item) or for a purchase of item 'A' from merchant 'A.' Alternatively, the offer may be for a purchase of a substitute of item 'A' (e.g., from merchant 'A' or from any other merchant).

In some embodiments, the offer is transmitted to the user's vehicle and not the user's mobile device. Therefore, the user views the offer on the display associated with the user's vehicle. In some embodiments, the offer is transmitted to the user's vehicle (or the user's mobile device) as the vehicle is at least one of entering or exiting the fuel station, or a predetermined period before entering the fuel station, or a predetermined period after exiting the fuel station. In some embodiments, the offer is transmitted to the user's vehicle (or the user's mobile device) when the fuel level in the user's vehicle falls below a predetermined threshold (e.g., 15% of the fuel tank capacity).

In some embodiments, the offer is transmitted to or presented to the user based on at least one of user information or account information associated with the user. The account information comprises a transaction history associated with the user's financial institution account. The transaction history may comprise at least one of a type of a transaction, a frequency associated with the transaction, an amount associated with the transaction, or a merchant associated with the transaction. Additionally or alternatively, the account information comprises an account balance history. Additionally or alternatively, the account information may or may not comprise information associated with incorrect, inconsistent, incomplete, or corrupted transactions. As used herein, a transaction may comprise a purchase, a deposit, a withdrawal, a credit, a debit, or the like. In some embodiments, account information, as used herein, refers to information associated with the user's financial institution account(s) managed by a single financial institution. In other embodiments, account information may refer to information associated with the user's financial institution accounts managed by multiple distinct financial institutions.

In some embodiments, the presented offer is an offer to receive at least one of a discount or a rebate on at least one of a purchase previously made by the user (e.g., a previous transaction associated with the user's financial institution account), a purchase from a merchant from which the user previously made a purchase, an alternative to the purchase previously made by the user, or an alternative to the purchase from the merchant from which the user previously made a purchase. The alternative to the purchase may be determined based on transaction histories associated with a plurality of financial institution accounts associated with multiple users. In some embodiments, the presented offer is an offer to receive at least one of a discount or a rebate on a product or service related to a previous purchase made by the user. For example, if the user previously bought a stove, the offer is a discount or rebate for a dishwasher or a stove maintenance service.

The user information comprises personal information associated with at least one of the user, a family member of the user, or a friend of the user, wherein the personal information comprises at least one of demographic information, salary information, contact information, residence address information (may also be referred to as mailing address information), job profile information, education information, or social network information. The offer is transmitted to or presented to the user based on substantially matching the user information or account information to offer information associated with the offer. For example, the offer is based on the residence address of the user or based on the transaction history of the user's financial institution account.

As explained herein, the system (e.g., the external server) may be configured to determine the offer (e.g., merchant associated with offer, expiry date of offer, product or service associated with offer, users associated with an account who can execute transactions associated with offer, minimum purchase amount associated with the offer, or the like) based on a purchase transaction that has already occurred (e.g., from the transaction history). In other embodiments, the system may be configured to determine the offer based on purchase transactions that have not yet occurred. Therefore, the system receives information (e.g., from a social network) regarding a purchase transaction to be executed by the user within a predetermined period of time in the future. In other embodiments, the user may pre-declare the user's intent to execute a particular purchase transaction in the future. The user may declare this intention on a social network. Additionally or alternatively, the user may provide this intent directly to merchants that the user is interested in received offers from. Additionally or alternatively, the user may provide this intent directly to the financial institution system described herein. For example, the user may communicate to the financial institution that the user is interested in receiving offers associated with particular offer categories (e.g., water sports, seafood, or the like) associated with a particular locality (e.g., near the user's rental property on a beach), associated with particular products or services, associated with a particular time frame, or the like. In other embodiments, the system determines or predicts a purchase transaction to be executed by the user within a predetermined period of time in the future. This prediction may be based on the account information (e.g., transaction history) and/or user information (e.g., change in residence address, social networking information, or the like) described herein. For example, the system may determine, based on the change in the user's residence address, that the user will make a purchase transaction associated with moving services, buying new furniture, or the like. As a further example, the system may determine, based on transaction history associated with recent transactions, that the user is getting ready to remodel the user's kitchen. Therefore, the offer may be related to the remodeling of the user's kitchen. For example, the offer may be an offer to buy paint or an offer to buy cabinet knobs.

In some embodiments, the system receives information associated with an event in the user's life (e.g., the user is expecting the birth of a new kid within the next month). The system may predict the occurrence of this event based on at least one of the account information or the user information described herein. Alternatively or additionally, the user may self-declare the occurrence of this event to the merchant and/or to the financial institution. Therefore, the offer may be based on this event in the user's life.

The offer is transmitted to or presented to the user based at least partially on the user not being excluded by at least one user exclusion rule associated with the offer and the merchant not being excluded by at least one merchant exclusion rule associated with the offer. A user exclusion rule comprises at least one of an affinity exclusion rule, a risk exclusion rule, or an account exclusion rule, and a merchant exclusion rule comprises a merchant category code exclusion rule.

As used herein, a user exclusion rule is a rule that excludes some users from receiving offers. In some embodiments, a user exclusion rule comprises an affinity exclusion rule. Therefore, if the financial institution (or a merchant partner associated with the financial institution) already has an existing relationship (e.g., for providing or sending offers associated with the particular merchant) with some users via an affinity program, those users are excluded from receiving an offer. The affinity exclusion rule comprises at least one of a full affinity exclusion rule or a partial affinity exclusion rule. When the affinity rule comprises a full affinity exclusion rule, the user is completely excluded from receiving an offer (e.g., an offer associated with a particular merchant) if the financial institution (or a merchant partner associated with the financial institution) already has an existing relationship with the user. When the affinity rule comprises a partial affinity exclusion rule, the user is excluded from receiving an offer associated with a particular product, service, or industry associated with a particular merchant that already has an existing relationship with the user for the particular product, service, or industry, but the user may receive offers associated with other products, services, or industries associated with the particular merchant. Additionally or alternatively, the user is excluded from receiving an offer associated with a competitor of a particular merchant if that particular merchant already has an existing relationship with the user.

In some embodiments, the at least one user exclusion rule comprises a risk exclusion rule. Therefore, if a user is determined to be a risky user (e.g., has a credit score lower than a predetermined threshold), the user is excluded from receiving an offer. In some embodiments, the at least one user exclusion rule comprises an account exclusion rule. Therefore, for example, if a user's account has a balance (or another account characteristic) that is lower than predetermined threshold, the user is excluded from receiving an offer.

In some embodiments, a merchant exclusion rule is a rule that excludes some merchants from providing offers to users associated with the financial institution. In some embodiments, the at least one merchant exclusion rule comprises a merchant category code exclusion rule. Therefore, a merchant associated with a predetermined merchant category code (e.g., a healthcare code) is excluded from providing an offer. However, the financial institution may set up a list of merchants that trigger exceptions. Merchants that trigger exceptions can provide offers even if these merchants are associated with the excluded merchant category codes.

At settlement time, the offer is processed as part of a batch processing operation, wherein the batch processing operation comprises processing a plurality of financial institution accounts. At settlement time, the offer is applied to: at least one purchase associated with a predetermined period, at least one purchase associated with a predetermined amount, an aggregate of a plurality of purchases, or a largest purchase. Therefore, upon completion of the batch processing operation, the rebate or discount associated with the offer is applied to the user's financial institution account. As used herein, settlement time may also be referred to as processing time.

In some embodiments, when a purchase transaction is processed by the financial institution at a predetermined time in the future (i.e., at settlement time or processing time), the system determines whether the offer is still active and whether the offer is still valid with respect to both the user and the merchant. This post-transaction process may be referred to as an offer reconciliation process. The offer is still active if the offer has not been revoked by at least one of the financial institution or the merchant and/or if the offer has not expired.

The offer is valid with respect to the merchant if the merchant is not excluded under any merchant exclusion rules at settlement. The offer is valid for the user if the user is not excluded under any user exclusion rules at settlement. Additionally, the offer is still valid for the user if, at settlement, offer information associated with the offer substantially matches at least one of user information or account information associated with the user. If the user has changed residence or if the user has changed transaction habits (thereby changing the user's transaction history), user information or account information associated with the user may not substantially match offer information associated with the offer. Therefore, if the offer is not valid for the user at settlement, a substitute offer may be applied at settlement. Offer information associated with the substitute offer may substantially match at least one of user information or account information associated with the user at settlement. Additionally, the substitute offer is not excluded under any merchant exclusion rules or user exclusion rules.

In some embodiments, multiple offers are presented to the user. The offers additionally specify that if the user executes transactions associated with a predetermined number of the multiple offers (e.g., 5 out of 10 offers) in a predetermined period (e.g., five days), the user's financial institution account will receive an additional discount or rebate on the last transaction in a sequence of transactions or on the aggregate of transactions executed by the user.

Additionally, in some embodiments, the offer may specify that the user will receive a discount or rebate on a transaction if the user additionally executes an activity independent of the transaction (e.g., posting a message on a social network). At settlement, the system determines whether the user executed the activity specified by the offer. If the user successfully executed the transaction and the activity, the user's financial institution account is credited with a rebate or discount associated with the offer. Additionally, in some embodiments, the discount or rebate associated with the user's transaction is increased based on whether the user transmitted the offer to other users, and/or whether the other users executed transactions associated with the transmitted offer prior to settlement of the user's transaction and/or offer.

Referring now to FIG. 2, FIG. 2 presents an exemplary block diagram of the system environment 200 for implementing the process flow 100 described in FIG. 1, in accordance with embodiments of the present invention. As illustrated, the system environment 200 includes a network 210, a system 230, and a user input system 240. Also shown in FIG. 2 is a user 245 of the user input system 240. The user input system 240 may be a mobile device described herein. The user 245 may be a person who uses the user input system 240 to execute a user application 247. The system 230 may be the external server described herein. The user application 247 and/or the system application 237 may incorporate one or more parts of the process flow 100 or any other function or process described herein. Any function described as being performed by the user input system 240 may be performed by the system 230, and any function or process described as being performed by the system 230 may be performed by the user input system 240.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, an in-vehicle touchscreen system, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be an external server as described herein. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application

237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flow 100 described and/or contemplated herein in connection with FIG. 1 or any other process flow described herein. Additionally, the system 230 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, the phrase "based on" may be used interchangeably with the term "comprising." As used herein, the term "upon" may mean at least one of "before," "during," or "after."

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for purchasing fuel for a vehicle from a fuel station, the apparatus comprising:
   a memory;
   a processor; and
   a computing module stored in the memory, executable by the processor, and configured to:
   receive pre-configured information associated with an information-providing source associated with at least one of a fuel station or a user at a portable mobile communication apparatus, wherein the pre-configured information comprises identification information associated with at least one of the fuel station, a fuel pump in the fuel station, the user, or a merchant associated with the fuel station;
   initiate, on a display of the portable mobile communication apparatus, a user interface in response to receiving the pre-configured information, wherein the user interface comprises address information associated with the fuel station and identification information associated with one or more fuel pumps associated with the fuel station;
   enable selection, on the user interface of the portable mobile communication apparatus, of a fuel pump associated with the fuel station, a type of fuel desired by the user, and an amount of fuel needed to fill the vehicle's fuel tank to a determined capacity, the amount of fuel being communicated from the vehicle to the apparatus;
   determine identification information associated with the fuel pump that will be used for fueling the vehicle based on positioning system information and location information associated with a social networking account;
   transmit a purchase authorization request to an external server based on the identification information and the pre-configured information, wherein the purchase authorization request comprises payment information, wherein the payment information is at least one of a payment card previously selected by the user to pay for a fuel purchase, a prepaid payment account associated with the pre-configured information, or a new payment card associated with the user, wherein the external server receives the payment information for the purchase authorization request, and processes the purchase authorization request based on one or more authorization rules, wherein processing the purchase authorization request further comprises determining the payment card, a payment amount, and an offer for the purchase authorization request, wherein determining further comprises:
      determining that the user is not excluded from receiving at least one offer based on at least a first user exclusion rule; and
      determining that the offer from the merchant associated with a predetermined category code is not excluded from being presented to the user based on at least a first merchant exclusion rule;
      wherein the first user exclusion rule and the first merchant exclusion rule are applied before the purchase authorization request is executed by the user;
   transmit the offer to the user, wherein the offer is transmitted via an online banking platform or an online banking application on the portable mobile communication apparatus associated with the user;
   receive an electronic receipt from the external server based on at least determining that the user has executed the purchase authorization request, wherein the external server sends an authorization prompt to the fuel station, wherein in response to receiving the authorization prompt an agent at the fuel station activates the fuel pump wherein determining that the user has executed the purchase authorization request further comprises:
      determining that the user is excluded from receiving the offer associated with the purchase authorization request based on at least a second user exclusion rule; and
      determining that the offer from the merchant is excluded from being presented to the user based on at least a second merchant exclusion rule;
      wherein the second user exclusion rule and the second merchant exclusion rule are applied after the purchase authorization request is executed by the user and before the purchase is settled at a predetermined future settlement date; and
   apply the offer to the purchase authorization request executed by the user at the predetermined future settlement date based on at least determining that the user and the offer from the merchant are not excluded at the time of the execution of the purchase and are excluded at the predetermined future settlement date.

2. The apparatus of claim 1, wherein the module is further configured to:
   enable selection, on the user interface, of a payment card to pay for the fuel purchase, wherein the apparatus accesses information associated with one or more payment cards.

3. The apparatus of claim 1, wherein the purchase authorization request is further based on at least one of payment card information, social networking information, or a selected type of fuel.

4. The apparatus of claim 1, wherein the apparatus comprises an image-capturing component, wherein the information-providing source comprises readable indicia, and wherein the apparatus enables capture of an image of the readable indicia.

5. The apparatus of claim 4, wherein the readable indicia is presented on a display associated with at least one of the fuel station or the fuel pump.

6. The apparatus of claim 4, wherein the readable indicia comprises a sticker attached to the fuel pump.

7. The apparatus of claim 4, wherein the readable indicia comprises a Quick Response (QR) code.

8. The apparatus of claim 1, wherein the information-providing source comprises a near-field communication (NFC) tag.

9. The apparatus of claim 1, wherein the pre-configured information comprises information pre-approved by at least one of a merchant associated with the fuel station or a user of the apparatus.

10. The apparatus of claim 1, wherein the pre-configured information is pre-configured to be associated with the apparatus and not to be associated with another apparatus.

11. The apparatus of claim 1, wherein a purchase transaction based on the purchase authorization request comprises a card-present transaction or a card-not-present transaction.

12. The apparatus of claim 1, wherein the apparatus is integrated into the vehicle.

13. A method for purchasing fuel for a vehicle from a fuel station, the method comprising:
- receiving, using a computing device processor, pre-configured information associated with an information-providing source associated with at least one of a fuel station or a user at a portable mobile communication apparatus, wherein the pre-configured information comprises identification information associated with at least one of the fuel station, a fuel pump in the fuel station, the user, or a merchant associated with the fuel station;
- initiating, on a display of the portable mobile communication apparatus, a user interface in response to receiving the pre-configured information, wherein the user interface comprises address information associated with the fuel station and identification information associated with one or more fuel pumps associated with the fuel station;
- enabling selection, on the user interface of the portable mobile communication apparatus, of a fuel pump associated with the fuel station, a type of fuel desired by the user, and an amount of fuel needed to fill the vehicle's fuel tank to a determined capacity, the amount of fuel being communicated from the vehicle to the apparatus;
- determining, using a computing device processor, identification information associated with the fuel pump that will be used for fueling the vehicle based on positioning system information and location information associated with a social networking account;
- transmitting, using a computing device processor, a purchase authorization request to an external server based on the identification information and the pre-configured information, wherein the purchase authorization request comprises payment information, wherein the payment information is at least one of a payment card previously selected by the user to pay for a fuel purchase, a prepaid payment account associated with the pre-configured information, or a new payment card associated with the user, wherein the external server receives the payment information for the purchase authorization request, and processes the purchase authorization request based on one or more authorization rules, wherein processing the purchase authorization request further comprises determining the payment card, a payment amount, and an offer for the purchase authorization request, wherein determining further comprises:
  - determining that the user is not excluded from receiving at least one offer based on at least a first user exclusion rule; and
  - determining that the offer from the merchant associated with a predetermined category code is not excluded from being presented to the user based on at least a first merchant exclusion rule;
  - wherein the first user exclusion rule and the first merchant exclusion rule are applied before the purchase authorization request is executed by the user;
- transmitting, using a computing device processor, the offer to the user, wherein the offer is transmitted via an online banking platform or an online banking application on the portable mobile communication apparatus associated with the user;
- receiving, using a computing device processor, an electronic receipt from the external server based on at least determining that the user has executed the purchase authorization request, wherein the external server sends an authorization prompt to the fuel station, wherein in response to receiving the authorization prompt an agent at the fuel station activates the fuel pump wherein determining that the user has executed the purchase authorization request further comprises:
  - determining that the user is excluded from receiving the offer associated with the purchase authorization request based on at least a second user exclusion rule; and
  - determining that the offer from the merchant is excluded from being presented to the user based on at least a second merchant exclusion rule;
  - wherein the second user exclusion rule and the second merchant exclusion rule are applied after the purchase authorization request is executed by the user and before the purchase is settled at a predetermined future settlement date; and
- applying, using a computing device processor, the offer to the purchase authorization request executed by the user at the predetermined future settlement date based on at least determining that the user and the offer from the merchant are not excluded at the time of the execution of the purchase and are excluded at the predetermined future settlement date.

14. A computer program product for purchasing fuel for a vehicle from a fuel station, the computer program product comprising:
- a non-transitory computer-readable medium comprising a set of codes for causing a portable mobile communication apparatus to:
  - receive pre-configured information associated with an information-providing source associated with at least one of a fuel station or a user at a portable mobile communication apparatus, wherein the pre-configured information comprises identification information associated with at least one of the fuel station, a fuel pump in the fuel station, the user, or a merchant associated with the fuel station;
  - initiate, on a display of the portable mobile communication apparatus, a user interface in response to receiving the pre-configured information, wherein the user interface comprises address information associated with the fuel station and identification information associated with one or more fuel pumps associated with the fuel station;
  - enable selection, on the user interface of the portable mobile communication apparatus, of a fuel pump associated with the fuel station, a type of fuel desired by the user, and an amount of fuel needed to fill the vehicle's fuel tank to a determined capacity, the amount of fuel being communicated from the vehicle to the apparatus;

determine identification information associated with the fuel pump that will be used for fueling the vehicle based on positioning system information and location information associated with a social networking account;

transmit a purchase authorization request to an external server based on the identification information and the pre-configured information, wherein the purchase authorization request comprises payment information, wherein the payment information is at least one of a payment card previously selected by the user to pay for a fuel purchase, a prepaid payment account associated with the pre-configured information, or a new payment card associated with the user, wherein the external server receives the payment information for the purchase authorization request, and processes the purchase authorization request based on one or more authorization rules, wherein processing the purchase authorization request further comprises determining the payment card, a payment amount, and an offer for the purchase authorization request, wherein determining further comprises:

determining that the user is not excluded from receiving at least one offer based on at least a first user exclusion rule; and determining that the offer from the merchant associated with a predetermined category code is not excluded from being presented to the user based on at least a first merchant exclusion rule;

wherein the first user exclusion rule and the first merchant exclusion rule are applied before the purchase authorization request is executed by the user; transmit the offer to the user, wherein the offer is transmitted via an online banking platform or an online banking application on the portable mobile communication apparatus associated with the user;

receive an electronic receipt from the external server based on at least determining that the user has executed the purchase authorization request, wherein the external server sends an authorization prompt to the fuel station, wherein in response to receiving the authorization prompt an agent at the fuel station activates the fuel pump wherein determining that the user has executed the purchase authorization request further comprises:

determining that the user is excluded from receiving the offer associated with the purchase authorization request based on at least a second user exclusion rule; and determining that the offer from the merchant is excluded from being presented to the user based on at least a second merchant exclusion rule;

wherein the second user exclusion rule and the second merchant exclusion rule are applied after the purchase authorization request is executed by the user and before the purchase is settled at a predetermined future settlement date; and apply the offer to the purchase authorization request executed by the user at the predetermined future settlement date based on at least determining that the user and the offer from the merchant are not excluded at the time of the execution of the purchase and are excluded at the predetermined future settlement date.

* * * * *